UNITED STATES PATENT OFFICE.

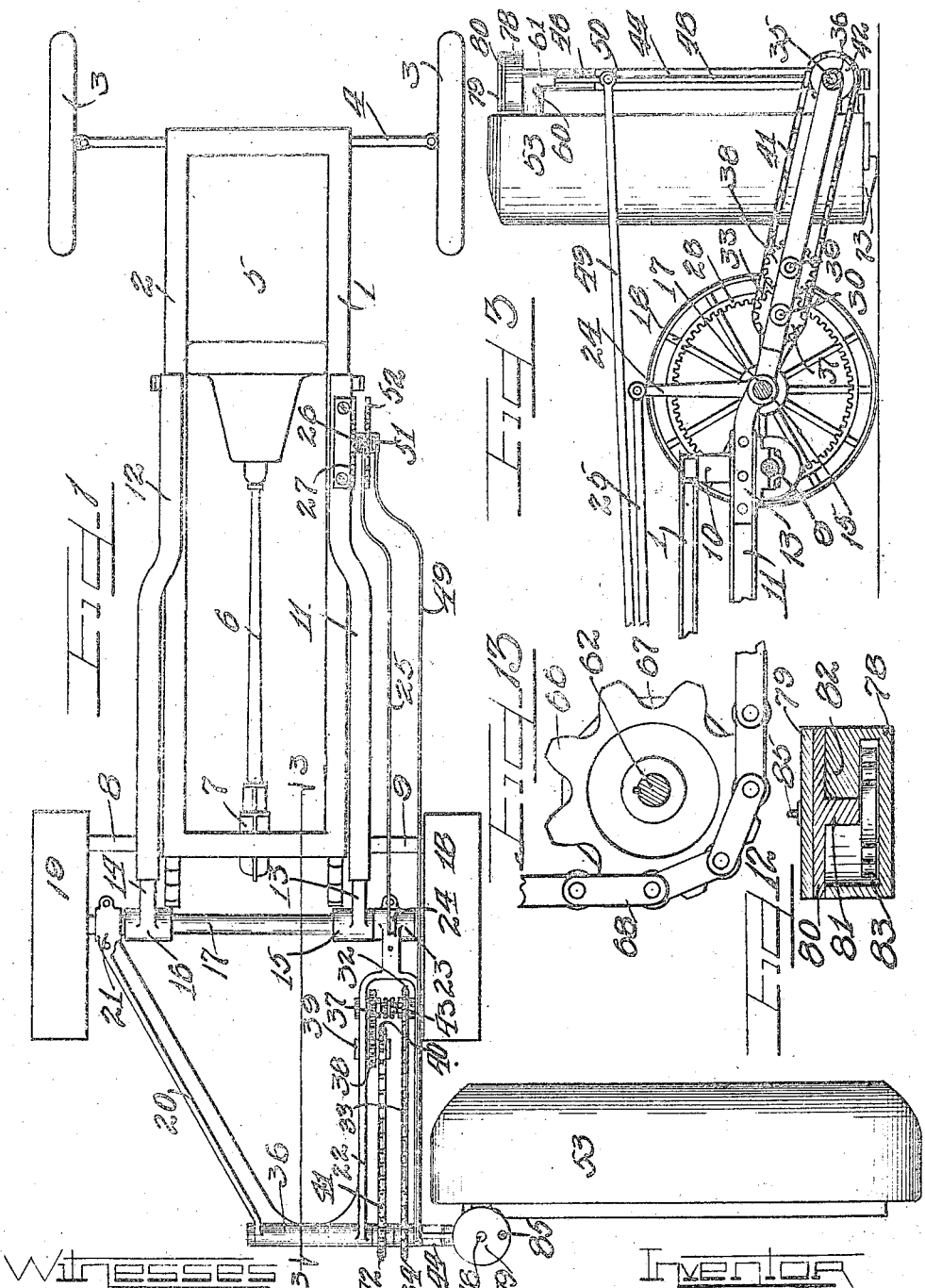

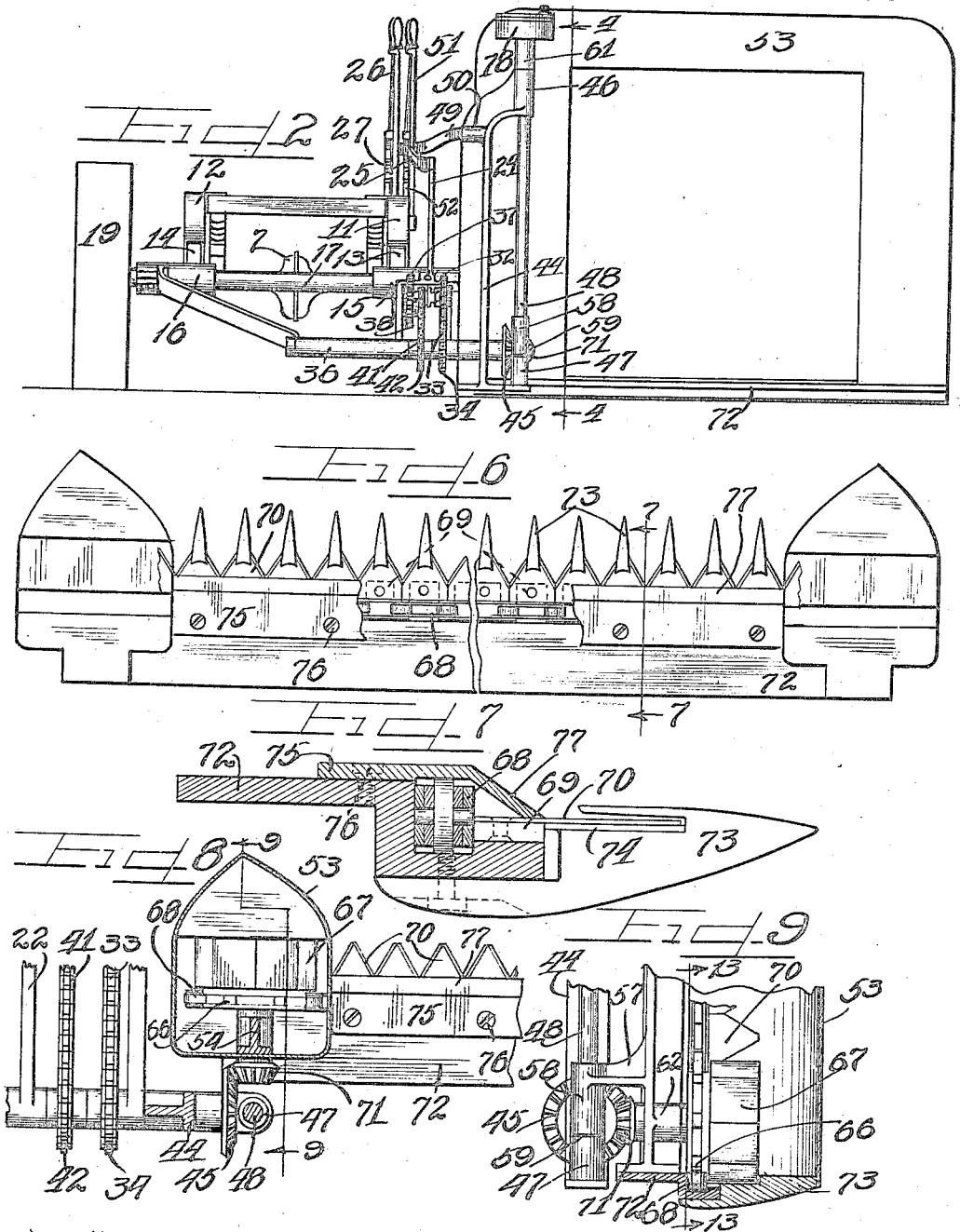

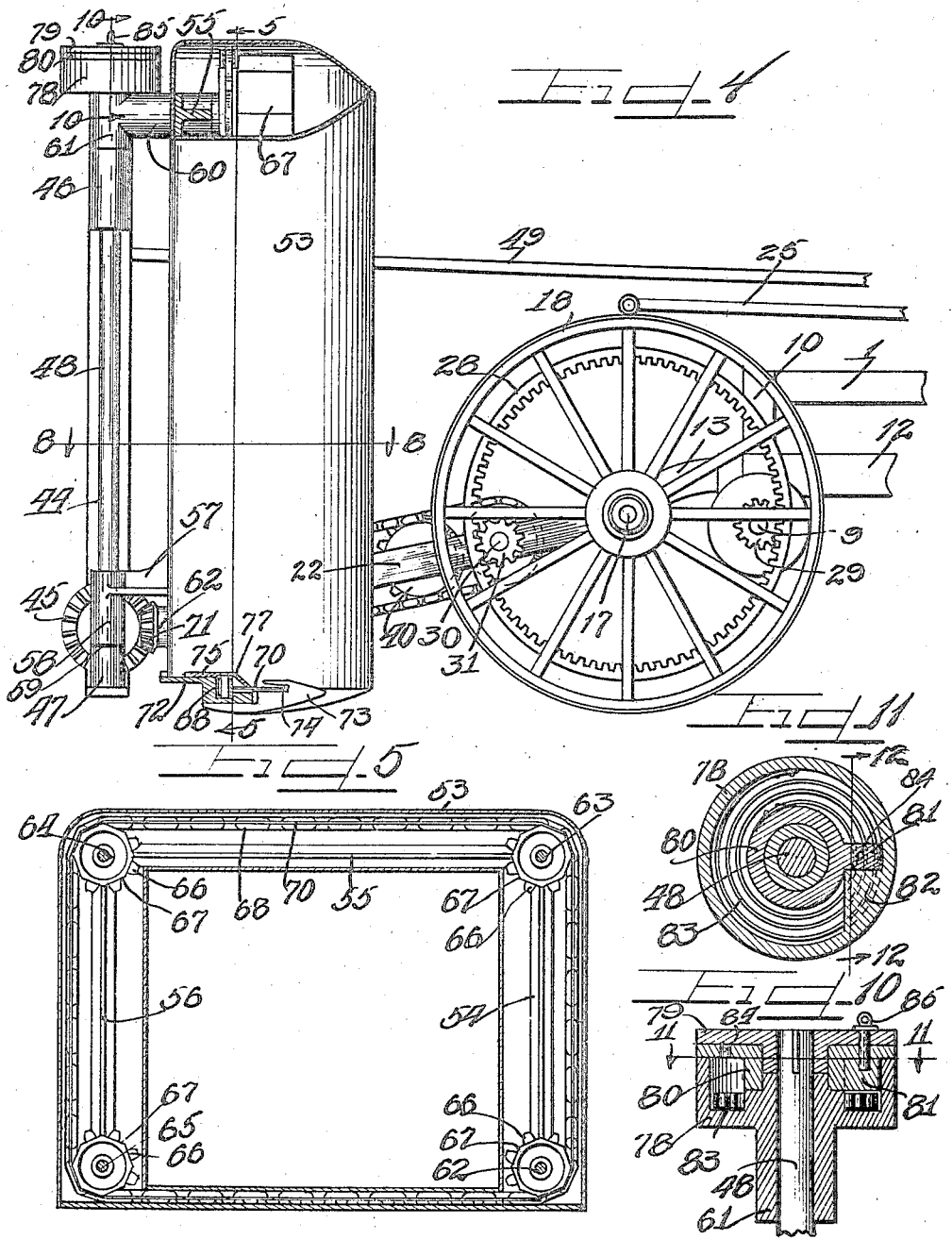

ALBERT E. COOK, OF EVANSTON, ILLINOIS.

CHAIN-CUTTER FOR REAPERS.

1,397,364.  Specification of Letters Patent.  Patented Nov. 15, 1921.

Application filed December 12, 1917. Serial No. 206,732.

*To all whom it may concern:*

Be it known that I, ALBERT E. COOK, a citizen of the United States, and a resident of the city of Evanston, in the county of Cook and State of Illinois, have invented certain new and useful Improvements in a Chain-Cutter for Reapers; and I do hereby declare that the following is a full, clear, and exact description of the same, reference being had to the accompanying drawings, and to the numerals of reference marked thereon, which form a part of this specification.

This invention pertains to an improved form of an endless cutting device adaptable for use in reaper or harvesting units which are adapted to be removably attached to the chassis of an automobile intermediate the front and rear wheels or behind the rear wheels as desired.

It is an object of this invention to construct a cutting unit adapted to be removably attached to the chassis of a motor vehicle and which is adapted to be driven by the power plant of said motor vehicle.

It is also an object of this invention to provide a cutter mechanism in which an endless cutter is used to permit a machine to be operated at a high rate of speed whereby a larger amount of material may be cut in a given time than has heretofore been possible with older devices.

An important object of the invention is the construction of a link-belt cutting mechanism adaptable for use in reapers and similar harvesting machines.

Another object of this invention is the construction of a cutting device adapted to automatically swing out of operating position when encountering an obstruction dangerous to the natural operation of the device to prevent breakage of the mechanism thereof.

It is a further object of the invention to provide a cutting mechanism adapted when not in use to be swung into an inoperative position to permit a vehicle to which the mechanism is removably attached to be moved through or stored in a space of restricted width.

It is furthermore an object of this invention to provide a link-belt on which cutting blades are removably secured to form an endless cutting mechanism.

An important object of this invention is the construction of a movably mounted endless chain cutting mechanism adapted to co-act with stationary cutters for cutting grass, grain or other products.

Other and further important objects of this invention will be apparent from the disclosures in the specification and drawings.

The invention (in a preferred form) is illustrated in the drawings and hereinafter more fully described.

On the drawings:

Figure 1 is a top plan view of a reaper unit embodying the principles of this invention, showing the same removably attached to the chassis of a vehicle.

Fig. 2 is a rear elevation thereof with the right rear wheel omitted.

Fig. 3 is a sectional view taken on line 3—3 of Fig. 1.

Fig. 4 is an enlarged sectional view taken on line 4—4, of Fig. 2.

Fig. 5 is a reduced section taken on line 5—5 of Fig. 4.

Fig. 6 is a plan view of the lower lap of the cutting mechanism with parts broken away and omitted to show the construction.

Fig. 7 is an enlarged section taken on line 7—7 of Fig. 6.

Fig. 8 is a sectional view taken on line 8—8 of Fig. 4.

Fig. 9 is a section on line 9—9 of Fig. 8.

Fig. 10 is an enlarged section taken on line 10—10 of Fig. 4.

Fig. 11 is a section on line 11—11 of Fig. 10.

Fig. 12 is a section on line 12—12 of Fig. 11.

Fig. 13 is an enlarged fragmentary detail view on line 13—13 of Fig. 9.

As shown on the drawings:

The chassis of an automobile or tractor is shown comprising frame members 1 and 2, front wheels 3, and a front axle 4. Secured to the frame is the power plant 5, from which a drive shaft 6, extends. The rear end of the drive shaft is connected with the differential housing 7, in which is secured the inner ends of two rear axles 8 and 9, the outer ends of which are suspended from the frame members 1 and 2, by means of bearing brackets 10. The reaper unit comprises frame members 11 and 12, which are attached to the frame members 1 and 2, at their forward ends and brackets or extension arms 13 and 14, are secured to the rear ends of the frame members 11 and 12, and are provided with bearings 15 and 16, on their outer ends in which an axle 17, is journaled, on the ends of which are secured drive wheels 18 and 19.

A frame is pivoted to the axle 17, and comprises an arm 20, having a bearing 21, on one end, which is removably journaled on the axle 17, near the drive wheel 19. A yoke arm 22, also forms part of said frame, and is provided with a bearing 23, which is removably journaled on the axle 17, adjacent the drive wheel 18. The cutting mechanism hereinafter described is attached to said frame, and for the purpose of elevating the same and said cutting mechanism an upwardly directed lever 24, is integrally formed or rigidly secured to the bearing 23. Attached to the lever 24, is a rod 25, the forward end of which is attached to an actuating lever 26, adapted to lockingly engage a gear segment 27.

The drive mechanism comprises annular inner gears 28, which are secured to the drive wheels 18 and 19. Meshing with said annular inner gears 28, are small gears 29, which are secured on the outer ends of the rear axles 8 and 9. A shaft 30, is journaled in the yoke arm 22, and said shaft has secured thereon a gear 31, which meshes with the annular inner gear 28, on drive wheel 18. Loosely journaled on the shaft 30, is a sprocket wheel 32, and trained therearound is a sprocket chain 33, which also engages around a sprocket wheel 34, secured on a shaft 35, rotatably supported in a bearing 36, of the frame. Said chain 33, is adapted to drive the cutting mechanism in one direction. For the purpose of reversing the drive, a gear 37, is loosely journaled on shaft 30, and meshes with an idler gear 38, on a stud shaft 39, mounted on the yoke member 22. A sprocket wheel 40, is secured on the stud shaft 39, and a sprocket chain 41, is trained therearound and around a sprocket wheel 42, on said shaft 35. A shift clutch 43, is slidably mounted on said shaft 30, to permit either the sprocket wheel 32, or the gear 37, to be engaged with the shaft 30, to effect a drive in either direction.

Pivoted on the outer end of the shaft 35, which is extended beyond the frame, is a standard 44. Secured on the outer end of said shaft 35, is a bevel gear 45. The standard 44, is provided with an upper and a lower bearing 46 and 47, respectively, in which is rigidly secured a stationary shaft 48. For the purpose of oscillating the standard 44, and thereby controlling the pitch of the cutting mechanism, a rod 49, is pivoted on a stud shaft 50 secured to the upper end of the standard. Said rod is connected at its other end to a lever 51, provided with a spring pressed detent adapted to removably and lockingly engage a gear segment 52, mounted adjacent the gear segment 27, near the front end of the chassis.

Journaled or rotatably mounted on the shaft 48, is the cutting mechanism which comprises a three sided housing or casing 53. The housing 53, embraces a shell of sheet metal or other suitable material, which is reinforced on the interior by means of T-bars 54, 55 and 56. Integral with the bar 54, is a bracket 57, to which is secured a bearing sleeve 58, journaled on the shaft 48. A washer 59, is disposed between the lower end of the bearing sleeve 58, and the bracket arm 47. A bearing 60, is secured to the upper end of the bar 54. Integrally formed on the outer end of said bracket arm 60, is a sleeve 61 which rotatably engages the upper end of the shaft 48. Journaled in suitable bearings in each corner of the housing 53, are short shafts 62, 63, 64 and 65. Secured on each of said shafts 62, 63, 64 and 65, is a sprocket wheel 66, on one side of which is integrally formed or rigidly secured an octagonal guide member 67. Trained around said sprocket wheels 66, is an endless sprocket chain 68. Each link of the chain 68 is provided with an extension tongue or attaching lug 69. Removably secured to each of said attaching lugs 69, by means of screws of other suitable means, is a knife or cutting blade 70, provided with double cutting edges. Said cutting blades 70, are disposed adjacent one another, to form a continuous or endless flexible cutter, the blades 70, of which may be replaced independently of one another for sharpening or repairs. Said cutter blades 70, are so disposed that when the chain 68, is in operation, said blades engage the flat peripheral surfaces of the guide members 67, which form the turning corners of the cutting mechanism, as shown clearly in Fig. 5. For the purpose of driving said endless cutter, a bevel pinion 71, is secured on the outer end of shaft 62, and meshes with the bevel gear 45.

Rigidly secured to the bottom of the housing 53, is a guard or cutter bar 72, to which are secured a plurality of adjacently disposed stationary guard teeth 73, provided with the usual ledger-blades 74, attached thereto. The guard bar 72. is recessed for the cutter chain 68, to travel therein, and the blades 70, pass through slots in the guard teeth 73, as is usual in reaper construction. For the purpose of confining the cutter blades in place to run smoothly, a retaining plate 75, is secured to the guard bar 72, by means of screw bolts 76, and the free margin 77, of said retaining plate 75, is inclined downwardly at an angle and provides sufficient space between the same and the guard bar 72, to permit the endless cutting mechanism to pass therebetween.

To permit the cutting mechanism to be swung rearwardly back of the machine when not in use, and to permit automatic release of the cutting mechanism when encountering an obstruction, a casing or housing 78, is provided integral with the sleeve 61, which is journaled on the stationary shaft 48. A cap 79, is keyed on the upper end of the shaft 48, and is therefore stationary. Interposed between said cap and the housing and loosely journaled on the hubs thereof, is a member 80, having a stop 81, integral therewith which is adapted to engage against a stop 82, integral with the housing 78. A strong spiral spring 83, normally holds said stops together, and has one end attached to the housing 78, and the other end attached to the movable member 80. An aperture is provided in the cap 79, and two apertures 84 are provided in member 80. In certain positions, of the member 80 one of the apertures 84, is adapted to register with the aperture in cap 79 to receive a pin 85, therethrough, for either preventing casing 78, and member 80, from rotating together, or permitting the same to rotate together when pin 85 is not in position.

The operation is as follows:

The reaper or harvesting unit is removably attached to the chassis of an automobile, tractor or other vehicle, either to the rear of the driving wheels or in front of the same. Said vehicle upon being driven or advanced, rotates the drive wheels 18 and 19, thereby driving the mechanisms for rotating the endless cutter chain 68, and the cutter blades 70, removably attached thereto. The cutting chain is endless and may therefore be driven at a high rate of speed, enabling the blades 70, thereof, to cut a much larger quantity of material in a given time, than is possible with a reciprocating cutter mechanism. The speed of rotation of the endless cutter is such that guard teeth need not be used, and may be omitted if desired.

Actuation of lever 26, tends to raise or lower the cutting mechanism to cut grass or grain at the desired height, and actuation of lever 51, varies the pitch of the cutting blades to obtain the best results under the existing conditions. When the blades become dull on one cutting edge, the clutch 43, is operated to reverse the direction of rotation, thereby presenting the remaining sharp edges of the blades in a position to cut. It will be noted, however, that the blades of the cutting mechanism or endless chain cutter herein described will stay sharp a long time, as there are practically four times the number of knives used as in a reciprocating mechanism and that at times, part of said blades are not cutting. This arrangement takes the continuous cutting strain off of every blade during a part of each rotation of the endless cutter, for while the blades are continuously rotating, yet when they pass beyond the field of operation, the cutting strain is not exerted on the blades until they pass through the housing into the field of operation.

In cutting, the release mechanism is keyed by pin 85, in the position shown in Fig. 10. In this position, if the cutting mechanism becomes clogged or strikes an obstruction, the cutting mechanism as a whole is thrown or swung rearwardly against the tension of the spring 83, out of cutting position. This prevents breakage, and the operation is entirely automatic. After the cause of obstruction is removed, the cutting mechanism automatically swings back to normal cutting position, which position is reached when the stops 81 and 82, contact. If it is desired to swing the cutting mechanism into an inoperative position, the pin 85, is removed and the cutting mechanism as a whole is manually rotated around the shaft 48, into a position wherein the other of said apertures 84, in member 80, is in position to register with the aperture in the cap 79, to permit the pin 85, to be inserted in said registering apertures, thus locking the mechanism in this position. In this position, the relative position of member 80, and the housing 78, remains the same, and the tension of the spring 83, is not affected.

I am aware that various details of construction may be varied through a wide range without departing from the principles of this invention, and I therefore do not purpose limiting the patent granted otherwise than necessitated by the prior art.

I claim as my invention:

1. In a harvesting machine, a unit, means for removably attaching the unit to a motor car, a vertical shaft, a cutting mechanism pivotally supported thereon forming a part of the unit and comprising a continuously rotating chain, lugs formed thereon projecting outwardly from one side thereof, knives removably secured thereto to form an endless cutter, a clutch mechanism for rotating the chain in either direction, and means on said shaft for automatically releasing the cutting mechanism when striking an obstruction to prevent breakage thereof.

2. In a mowing machine, a unit adapted for attachment to a motor car, a cutting mechanism forming a part thereof and comprising a continuously rotating endless chain, knives secured thereon, sprocket wheels supporting said endless chain, means connected with one of said sprocket wheels for rotating the endless chain in either direction, and a knife guide secured on one side of each of said sprocket wheels and rotatable therewith to act as guides for said knives.

3. A reaper unit comprising a frame, drive wheels, a reversible driving mechanism on said frame actuatable by said wheels, a housing pivoted to the frame, sprocket wheels journaled therein, one of which is driven by said driving mechanism, a chain trained around said sprocket wheels, a plurality of cutting blades removably secured on said chain to form an endless cutter, and guide members for said blades formed adjacent one side of each of said sprocket wheels.

4. In a reaper unit, drive wheels, a frame associated therewith, a housing rotatably supported by the frame, a guard bar secured to said housing, stationary cutters secured to said guard bar, an endless chain rotatable in said housing, sprocket wheels in said housing for supporting said chain, blade guides formed on one side of said sprocket wheels, cutting blades removably secured on said chain to form an endless cutter adapted to co-act with said stationary cutters, and mechanism on said frame connected with said sprocket wheels and operated by said drive wheels for actuating said endless chain and cutter.

5. In a reaper unit, drive wheels, a frame pivotally associated therewith, a housing rotatably supported on the frame, a guard bar and teeth attached to said housing, an endless chain in said housing, blades thereon at right angles to the plane of said endless chain and forming an endless cutting mechanism adapted to rotate through the housing and guard teeth, mechanism operated by the drive wheels for actuating the cutting mechanism, means for swinging the frame on its pivot to vary the elevation of the cutting mechanism, and mechanism for adjusting the pitch of the cutting mechanism.

6. A reaper cutting mechanism comprising a pivoted housing, sprocket wheels journaled therein, guide members thereon, an endless chain trained around said sprocket wheels, a plurality of blades removably secured to said chain to form an endless cutter adapted to engage around said guide members, and mechanism connected with one of said sprocket wheels to rotate the same to cause rotation of said chain and cutter.

7. A cutting mechanism comprising a housing, sprocket wheels journaled therein, knife guide members forming a part of said sprocket wheels, an endless chain engaged around said sprocket wheels, knives removably secured to said chain to form an endless cutter adapted to pass around said guide members, stationary knives secured on said housing adapted to coact with said endless cutter, and means connected with said sprocket wheels for rotating the same to cause rotation of said chain and cutter.

8. The combination with a harvesting machine, of a housing adjustably mounted thereon, sprocket wheels in said housing, blade guides integrally formed on one side of said sprocket wheels, driving means connected to one of said sprocket wheels, an endless chain trained around said sprocket wheels to be driven thereby, and cutting blades removably secured to said endless chain adapted to be guided around corners by said guides.

9. The combination with a motor vehicle, of a frame mounted thereon, a vertical shaft supported on said frame, a housing pivotally mounted on said shaft, an endless cutter in said housing, means for driving said endless cutter from the vehicle, a casing supported on said housing, a stop formed therein, a cap for said casing secured on said vertical shaft, a stop member between said casing and said cap adapted to coact with the casing stop, and a spring in said casing secured to the casing and to said stop member to permit automatic adjustment of the housing when an unusual obstruction is struck.

10. The combination with a reaper frame of a vertical shaft supported thereon, a cutter mechanism adjustably supported on said vertical shaft, and a spring controlled mechanism supported on said shaft and on said cutter mechanism adapted to permit the cutter mechanism to automatically move out of the way when an unusual obstruction is struck.

In testimony whereof I have hereunto subscribed my name in the presence of two subscribing witnesses.

ALBERT E. COOK.

Witnesses:
 EARL M. HARDINE,
 CHARLES W. HILLS, Jr.